Patented Mar. 17, 1931

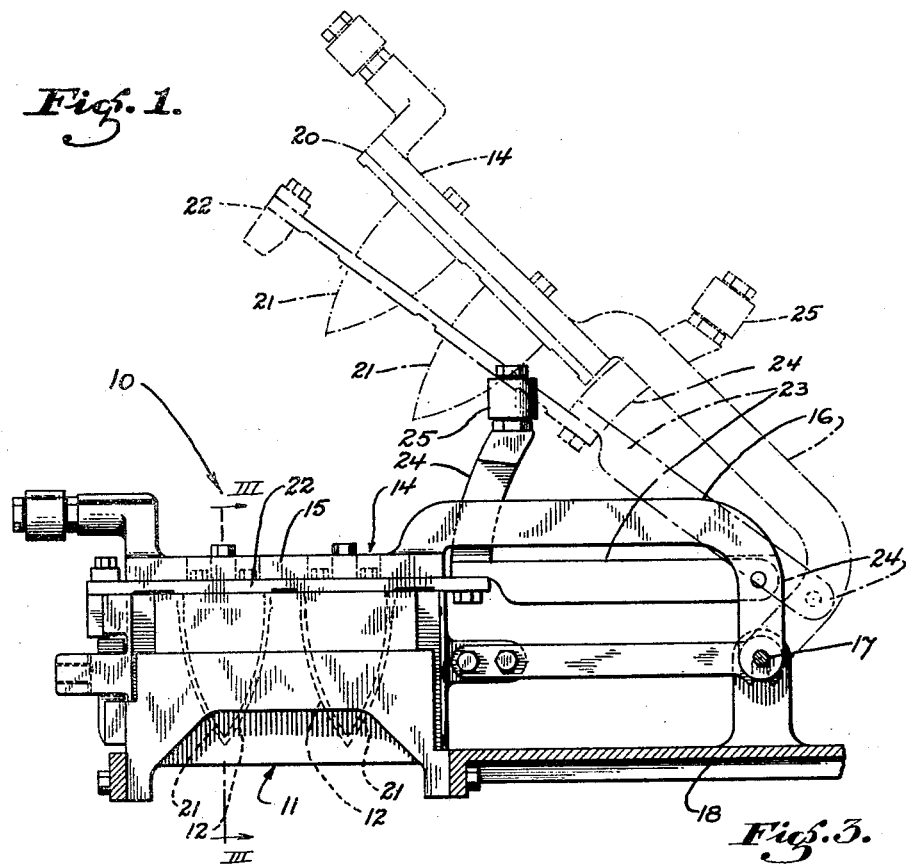
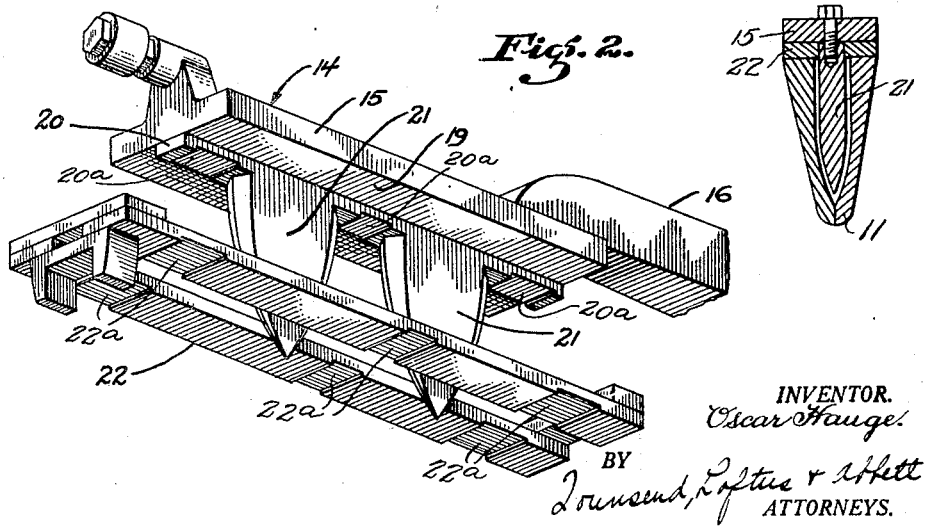

1,797,086

UNITED STATES PATENT OFFICE

OSCAR HAUGE, OF SAN MATEO, CALIFORNIA, ASSIGNOR TO NATIONAL BISCUIT COMPANY, A CORPORATION OF NEW JERSEY

MOLDING UNIT FOR CONE-BAKING MACHINES

Application filed August 26, 1929. Serial No. 388,553.

This invention relates to pastry baking machines, and it particularly pertains to a molding unit therefor.

Hitherto, pastry cone baking machines have been equipped with molding units in which the mold and core carrier are hinged together. In this type of construction a stripper plate is employed and is hinged to the core carrier. The function of this stripper plate is to strip the baked cones from the cores after the latter have been extracted from the mold. The stripper plate is formed with openings which tightly fit the enlarged ends of the conical cores, to prevent leakage of the batter between the cores and the stripper during the forming of the cone. Due to the conical form of the cores, the stripper plate is free to oscillate relative to the carrier in order to function in stripping the baked cones away from the cores. This prior type of construction, however, cannot be employed when using cores with substantially parallel sides, due to the fact that it would be impossible to swing the stripper through an arc without having the openings in the stripper very loosely receive the cores. This would be impractical because it would permit the batter to escape between the cores and stripper during the cone forming operation. Therefore, it is the principal object of the present invention to improve the construction and operation of molding units in machines so that a positive stripping action is obtained and free movement of the stripper is insured, regardless of the configuration of the cores and without any possibility of leakage between the cores, stripper and mold.

One form which the invention may assume is exemplified in the following description and illustrated by way of example in the accompanying drawings, in which:

Fig. 1 is a view in elevation of a molding unit of a pastry baking machine,

Fig. 2 is a perspective view of the core carrier and the stripper.

Fig. 3 is a transverse cross-section taken on the line III—III of Figure 1.

Referring more particularly to the accompanying drawings, 10 indicates a molding unit of a pastry cone baking machine. This unit comprises a mold 11, having two sockets 12 formed therein. The mold 11 may be of any preferred design.

Arranged above the mold is what I prefer to term a core carrier 14, which comprises a flat plate 15 having a rigid arm 16. This arm 16 is pivoted as at 17 to the molding unit carrier 18. The mold 11 is rigidly fixed to the carrier 18 so that any swinging movement of the core carrier 15 will be relative to the mold 11.

The core carrier 15 is formed with a plane lower surface 19. Arranged on this surface longitudinally of the carrier is what I prefer to term a filler bar 20. This filler bar 20 is rectangular in cross section and is rigidly secured to the lower surface 19 of the carrier 15. Formed integral with the filler bar 20 is a pair of cores 21 which project at right angles to the surface 19 of the carrier 15. These cores 21 are of a thickness agreeing with the width of the filler bar 20.

The sides of the cores 21 extend substantially parallel to the sides of the filler bar and have substantially parallel edges. These cores are adapted to cooperate with the sockets 12 in producing a hollow pastry cone.

Arranged to cooperate with the cores 21 on the carrier 14 is a stripper plate 22. This stripper plate is fitted with an arm 23, which is pivoted as at 24 to the arm 16 of the carrier 15. This connection between the stripper 22 and the carrier 15 enables the stripper to oscillate relative to the carrier to strip pastry cones adhering to the cores 21. The stripper 22 is also formed with a vertical arm 24 fitted with a cam roller 25. This cam roller 25 cooperates with a suitable tripping cam on the machine to actuate the stripper in stripping pastry cones from the cores 21.

The stripper 22 is formed with a longitudinal slot agreeing in dimensions with the filler bar 20, with which it is in alignment. The thickness of the stripper 22 agrees with the thickness of the filler bar 20, so that when the stripper 22 is interposed between the carrier 15 and the top of the mold 11 its lower surface will be flush with the lower surface of the filler bar 20.

It will be noted that the ends of the filler bar 20 and the slot in the stripper extend considerably beyond the cores 21 so that the stripper 22 may freely oscillate relative to the carrier 14 and the cores 21. Also, as the side surfaces of the cores 21 are flush with the side surfaces of the filler bar 20, any cones adhering to the cores 21 will be stripped when the stripper 22 is moved to open position, as illustrated in dotted lines in Fig. 1.

In operation of the device it is constructed and assembled substantially as shown in the drawings, in a pastry baking machine. Batter is inserted into the mold socket 12, and the carrier 15 is lowered until the stripper 22 is in firm contact with the top of the mold and with the bottom of the carrier 15. In this position the bottom of the stripper 22 will be flush with the lower surface of the filler bar 20, presenting an uninterrupted surface to the top of the mold, and forming a tight joint around the top of the mold to prevent batter from escaping upwardly around the cores.

After the formed cones have been properly baked the carrier, together with the stripper 22 is swung upwardly so as to withdraw the cores 21 and the cones thereon from the mold. The stripper 22 is then lowered relative to the carrier 15, and as the side edges of the slot in the stripper lie in substantially the same plane as the side surfaces of the cores, the pastry cones on the cores 21 will be stripped therefrom. The filler bar 20 is provided with grooves 20a and the stripper 22 has corresponding grooves 22a.

From the foregoing it is obvious that I have provided an improved molding unit for pastry baking machines wherein an improved stripper construction is provided which will function efficiently, regardless of the configuration of the cores, and which will cooperate with the cores and core carrier in preventing leakage from the molds during the cone forming operation.

While I have shown the preferred form of my invention, it is to be understood that various changes may be made in its construction by those skilled in the art, without departing from the spirit of the invention, as defined in the appended claims.

Having thus described my invention, what I claim and desire to secure by Letters Patent is:

1. In a molding unit a mold, a core carrier having a plane surface, cores projecting from said surface, an upraised section at the base of the cores and flush with the sides thereof, said upraised section extending longitudinally beyond the cores, a stripper plate of a thickness the same as said upraised section, said stripper plate being formed with an opening of a configuration, and dimensions agreeing with said upraised section whereby the stripper plate may be assembled on said carrier, with the upraised section received in the opening of the stripper plate.

2. In a molding unit a mold, a core carrier operatively associated with the mold, cores projecting from said core carrier, a filler means of a width agreeing with the width of the cores, and extending beyond the same at both sides thereof, and a stripper plate pivoted to the core carrier and of a thickness agreeing with the thickness of the filler means, said core carrier being formed with an opening of a configuration agreeing with the configuration of the filler means, and adapted to embrace the same.

3. In a molding unit a mold, a core carrier operatively associated with the mold and pivotally mounted for swing movement relative to the mold, said core carrier being formed with a plane lower surface, a filler bar arranged on said surface longitudinally of the carrier, cores formed integral with and extending from said filler bar at right angles to the lower surface of the carrier and agreeing in thickness with the width of the filler bar, said filler bar extending longitudinally of the carrier beyond the edges of the core, a stripper plate pivoted to the core carrier, said plate being of a thickness agreeing with the thickness of the filler bar, said stripper plate being formed with an opening of the same configuration and dimensions as the filler bar, whereby said plate may be arranged closely contiguous to the lower surface of the carrier with the filler bar nested within the opening.

4. In a molding unit of the character described a mold, a core carrier, a core projecting from the carrier, a stripper plate cooperating with said core, said stripper plate having grooves formed in it for the reception of material overflowing from said mold.

5. In a molding unit of the character described a mold, a core carrier, a core projecting from the carrier, and a stripper plate cooperating with said core, said stripper plate having grooves formed in it at a distance from said mold for the reception of material overflowing from said mold whereby the overflow material adjacent the mold will be relatively thin.

6. In a molding unit of the character described a plurality of molds, a core carrier, a stripper plate interposed between said molds and core carrier, a filler bar, and a plurality of cores on said core carrier, said stripper plate and filler bar having grooves formed therein for the reception of material overflowing from said molds.

OSCAR HAUGE.